Nov. 27, 1962 J. MATARESE 3,066,287
ELECTROLUMINESCENT DEVICE
Filed March 25, 1960
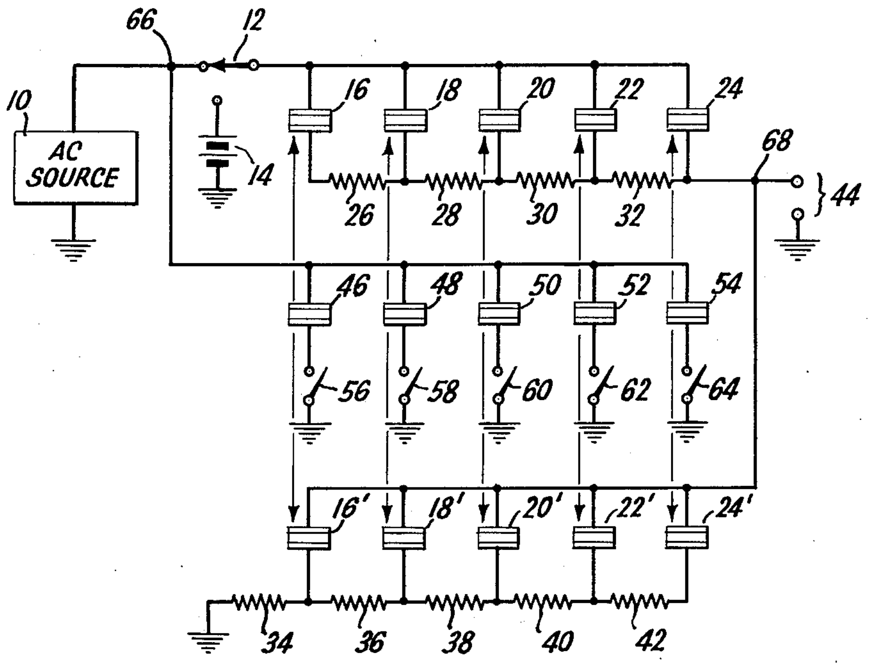
INVENTOR
JOHN MATARESE
BY
ATTORNEY United States Patent Office 3,066,287

Patented Nov. 27, 1962

3,066,287

ELECTROLUMINESCENT DEVICE

John Matarese, Bronx, N.Y., assignor to General Telephone & Electronics Laboratories, Inc., a corporation of Delaware Filed Mar. 25, 1960, Ser. No. 17,514
9 Claims. (Cl. 340—347)

My invention relates to digital to analog converters.

One type of digital to analog converter is provided with a plurality of input terminals and an output terminal. An electrical input signal is supplied to a selected input terminal, and an electrical output signal appears at the output terminal. The level of the output signal is determined by the position of the selected input terminal relative to the positions of the unselected terminals, and further, this signal level changes as the position of the selected input terminal. Stated differently, the input signal defines a predetermined code which represents specified information as, for example, one or more numerical digits, and the level of the output signal, for example a voltage value, is determined by the particular information specified, the level changing with changes in the code.

I have invented a digital-to-analog converter of this type which employs electroluminescent and photoconductive cells and does not use any of the rectifiers, transistors or vacuum tubes customarily employed for this purpose. My converter is low in cost and can be assembled quickly and easily.

In accordance with the principles of my invention, I provide N different electroluminescent cells, each of which when energized emits light. I further provide first and second sets of photoconductive elements, each set containing N different elements. Corresponding elements in both sets are optically coupled to corresponding cells. As a consequence of this optical coupling, when any cell is energized, the light thus emitted impinges upon the corresponding elements in both sets; due to the photoconductive effect, the resistance of these elements is extremely low. When any cell is deenergized, the resistance of the corresponding elements is extremely high.

One end of each of the first set elements is connected to a first terminal. One end of each of the second set elements is connected to a second terminal. A first two-terminal voltage divider network is coupled between the other end of a selected one of the first set elements and the second terminal. A second two-terminal voltage divider network is coupled between the other end of a selected one of the second set elements and a third terminal. Each network is provided with a plurality of intermediate taps, the taps on the first network being respectively coupled to the other ends of the unselected first set elements, the taps on the second network being respectively coupled to the other ends of the unselected second set elements.

A first voltage is applied between the first and third terminals and a second voltage appears between the second and third terminals.

When one of these electroluminescent cells is selectively energized by an input signal, the resistances of the corresponding elements are reduced to extremely low values, portions of the networks are effectively short circuited, and the second voltage attains a value different from zero, this value changing as one or the other of the cells is energized. Thus, the second voltage represents an output signal, the value of which is determined by the particular cell energized.

An illustrative embodiment of my invention will now be described with reference to the accompanying FIGURE.

Referring now to the figure, there is shown a plurality, in this example five, different electroluminescent cells 46, 48, 50, 52, and 54, each of which is connected in series with a corresponding one of switches 56, 58, 60, 62 and 64 across an alternating current power supply or source 10. A first set of photoconductive elements, in this example five elements, 16, 18, 20, 22 and 24, have one end connected in common through switch 12 to the high voltage terminal 66 of source 10. A first voltage divider network consisting of series connected resistors 26, 28, 30 and 32 is connected between the other end of photoconductive element 16 and a terminal 68. The junction of resistors 26 and 28 is connected to the other side of element 18. The junction of resistors 28 and 30 is connected to the other side of element 20. The junction of resistors 30 and 32 is connected to the other side of element 22. The other side of element 24 is connected to terminal 68.

I further provide a second set of photoconductive elements, in this example five elements, 16′, 18′, 20′, 22′ and 24′. One side of each of these elements is connected to terminal 68.

I further provide a second voltage divider network consisting of series connected resistors 34, 36, 38, 40 and 42 connected between the other side of element 42 and ground. The junction of resistors 34 and 36 is connected to the other side of element 16′. The junction of resistors 36 and 38 is connected to the other side of element 18′. The junction of resistors 38 and 40 is connected to the other side of element 20′. The junction of resistors 40 and 42 is connected to the other side of element 22′. The corresponding elements in each of the second set are optically coupled to the corresponding electroluminescent cells. For example, elements 16 and 16′ are optically coupled to electroluminescent cell 46.

This system then works in the following manner. Assuming the voltage between terminal 66 and ground to be V, when switch 56 is closed and switches 58, 60, 62, and 64 are opened, a voltage of 0.2V appears across terminal 44. If then 56 is opened and switch 58 is closed, a voltage of 0.4V will appear across terminal 44. Hence, when any one of the switches 56, 58, 60, 62, and 64 is closed, a corresponding fraction of the voltage V appears across the output terminals.

More particularly, when any switch is closed, the corresponding electroluminescent cell is energized. This cell then produces light which impinges upon the corresponding photoconductive elements and changes their resistance from a very high value to a very low value. The very low value for the purpose of this invention can be regarded essentially as a short circuit, since the values of resistors 26, 28, 30, 32, 34, 36, 38, 40 and 42 (which are all equal) are each much higher than the illuminated resistance of the photocoductive elements and at the same time much lower than the dark resistance of each of the photoconductive elements. Thus, the entire arrangement operates as a voltage divider network, the actual fraction of the input voltage which appears as the output voltage being determined by the number and relative position of switches 56, 58, 60, 62, and 64. Since each of these switches when closed provides a voltage signal which actuates the corresponding electroluminescent cell, an input pulse train can be supplied to each cell without the use of switches, the cells being energized in the presence of pulses and deenergized in the absence of pulses.

The output voltage can be either an alternating voltage or a direct voltage, from battery 14 depending upon the position of switch 12.

In the absence of an input signal, a spurious output signal can appear across terminals 44. All such spurious signals can be eliminated by providing means for grounding both of terminals 44 in the absence of an input signal. Such means can include an additional electroluminescent cell energized in the absence of an input signal and an additional photoconductive element optically coupled to this additional electroluminescent cell and electrically interposed between the bottom one of terminals 44 and ground.

Alternatively, an additional photoconductive element can be electrically interposed between point 66 and switch 12, this element being optically coupled to all electroluminescent cells 46, 48, 50, 52, and 54. Under these circumstances, when all of these electroluminescent cells are dark, the entire circuit is electrically isolated from source 10.

What is claimed is:

1. A digital to analog converter comprising N different electroluminescent cells; first and second sets of photoconductive elements, each set containing N different elements, corresponding elements in both sets being optically coupled to a corresponding cell; one end of each of first set elements being connected in common to a first terminal, one end of each of said second set elements being connected in common to a second terminal; and first and second two-terminal voltage divider networks,, each network having a plurality of intermediate taps, said first network being coupled between the other end of a selected one of said first set elements and said second terminal, the second network being coupled between the other end of a selected one of said second set elements and a third terminal, the taps on said first network being respectively coupled to the other ends of the unselected first set elements, the taps on said second network being respectively coupled to the other ends of the unselected second set elements.

2. A digital to analog converter comprising N different electroluminescent cells; first and second sets of photoconductive elements, each set containing N different elements, corresponding elements in both sets being optically coupled to a corresponding cell; one end of each of first set elements being connected in common to a first terminal, one end of each of said second set elements being connected in common to a second terminal; first and second two-terminal voltage divider networks, each network having a plurality of intermediate taps, said first network being coupled between the other end of a selected one of said first set elements and said second terminal, the second network being coupled between the other end of a selected one of said second set elements and a third terminal, the taps on said first network being respectively coupled to the other ends of the unselected first set elements, the taps on said second network being respectively coupled to the other ends of the unselected second set elements; means to apply a first voltage between said first and third terminals whereby a second voltage appears between said second and third terminals; and means to energize a selected one of said cells to cause light to be emitted therefrom, the value of said second voltage being determined by the position of the selected cell.

3. A converter as set forth in claim 2 wherein said first voltage is a direct voltage.

4. A converter as set forth in claim 2 wherein said first voltage is an alternating voltage.

5. A digital to analog converter comprising N different electroluminescent cells; first and second sets of photoconductive elements, each set containing N different elements, corresponding elements in both sets being optically coupled to a corresponding cell; one end of each of first set elements being connected in common to a first terminal, one end of each of said second set elements being connected in common to a second terminal; first and second two-terminal voltage divider networks, said first network being coupled between the other end of a selected one of said first set elements and said second terminal, the second network being coupled between the other end of a selected one of said second set elements and a third terminal, each network including a plurality of resistors connected in series; means interconnecting the junction of each two adjacent resistors in said first network to another end of each of the unselected first set elements, and means interconnecting the junction of each two adjacent resistors in said second network to another end of each of the unselected second set elements.

6. A converter as set forth in claim 5 wherein said first network includes $(N-1)$ resistors and said second network includes N resistors.

7. A converter as set forth in claim 5 wherein N is equal to 5.

8. A digital to analog converter comprising N different electroluminescent cells; first and second sets of photoconductive elements, each set containing N different elements, corresponding elements in both sets being optically coupled to a corresponding cell; one end of each of first set elements being connected in common to a first terminal, one end of each of said second set elements being conected in common to a second terminal; first and second two-terminal voltage divider networks, each network having a plurality of intermediate taps, said first network being coupled between the other end of a selected one of said first set elements and said second terminal, the second network being coupled between the other end of a selected one of said second set elements and a third terminal, the taps on said first network being respectively coupled to the other ends of the unselected first set elements, the taps on said second network being respectively coupled to the other ends of the unselected second set elements; and N different switches, each switch being coupled between said third terminal and a corresponding electroluminescent cell.

9. A digital to analog converter comprising N different electroluminescent cells; first and second sets of photoconductive elements, each set containing N different elements, corresponding elements in both sets being optically coupled to a corresponding cell; one end of each of first set elements being connected in common to a first terminal, one end of each of said second set elements being connected in common to a second terminal; first and second two-terminal voltage divider networks, each network having a plurality of intermediate taps, said first network being coupled between the other end of a selected one of said first set elements and said second terminal, the second network being coupled between the other end of a selected one of said second set elements and a third terminal, the taps on said first network being respectively coupled to the other ends of the unselected first set elements, the taps on said second network being respectively coupled to the other ends of the unselected second set elements; a voltage source coupled between said first and second terminals; and N different switches, each switch being connected in series with a corresponding cell between said first and second terminals.

References Cited in the file of this patent

UNITED STATES PATENTS

| | | |
|---|---|---|
| 2,827,233 | Johnson | Mar. 18, 1958 |
| 2,900,574 | Kazan | Aug. 18, 1959 |
| 2,905,830 | Kazan | Sept. 22, 1959 |
| 2,907,001 | Loebner | Sept. 29, 1959 |
| 2,920,232 | Evans | Jan. 5, 1960 |

OTHER REFERENCES

IBM Technical Disclosure Bulletin, "Digital to Analog Converter," by J. A. O'Connell, vol. 1, No. 5, February 1959.